US011176367B1

(12) United States Patent
Fix et al.

(10) Patent No.: US 11,176,367 B1
(45) Date of Patent: Nov. 16, 2021

(54) APPARATUSES, SYSTEMS, AND METHODS FOR MAPPING A SURFACE OF AN EYE VIA AN EVENT CAMERA

(71) Applicant: Facebook Technologies, LLC, Menlo Park, CA (US)

(72) Inventors: Alexander Jobe Fix, Seattle, WA (US); Andrew Wyman MacDonald, Seattle, WA (US); Dmitri Model, Fremont, CA (US); Mohammadhossein Daraeihajitooei, Seattle, WA (US); Javier San Agustin Lopez, Menlo Park, CA (US); Mohamed Hegazy, Sammamish, WA (US); Scott Robert Ramsby, Kirkland, WA (US); Sebastian Sztuk, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/400,979

(22) Filed: May 1, 2019

(51) Int. Cl.
G06K 9/00 (2006.01)
H04N 5/225 (2006.01)
(Continued)

(52) U.S. Cl.
CPC ..... *G06K 9/00604* (2013.01); *G02B 27/0172* (2013.01); *G02B 27/0179* (2013.01);
(Continued)

(58) Field of Classification Search
CPC .. G06K 9/00604; G06K 9/2027; G06T 7/246; G06T 7/60; G02B 27/0172;
(Continued)

(56) References Cited

U.S. PATENT DOCUMENTS

2005/0175218 A1* 8/2005 Vertegaal ............... A61B 3/113
382/103
2010/0211680 A1* 8/2010 Chatterton ............ G06F 9/5011
709/226
(Continued)

OTHER PUBLICATIONS

Delbruck et al., "Activity-Driven, Event-Based Vision Sensors", IEEE International Symposium on Circuits and Systems (ISCAS), May 30-Jun. 2, 2010, pp. 2426-2429.
(Continued)

*Primary Examiner* — Matthew K Kwan
(74) *Attorney, Agent, or Firm* — FisherBroyles, LLP

(57) ABSTRACT

A disclosed computer-implemented method may include directing an illumination source, positioned at a predetermined position relative to an event camera positioned to receive light from the illumination source reflected by a portion of a cornea of a user during an illumination sequence, to illuminate the portion of the cornea of the user in accordance with the illumination sequence. The method may also include detecting, via the event camera, a set of events, each event in the set of events comprising a change in an intensity of light from the illumination source received by a pixel included in the event camera over a sampling period of the event camera. The method may further include determining a shape of the portion of the cornea of the user based on the predetermined position, the illumination sequence, and the set of events. Various other apparatuses, systems, methods, and computer-readable media are also disclosed.

20 Claims, 11 Drawing Sheets

(51) Int. Cl.
*G06T 7/246* (2017.01)
*G02B 27/01* (2006.01)
*G06T 7/60* (2017.01)
*G06K 9/20* (2006.01)

(52) U.S. Cl.
CPC ............ *G06K 9/2027* (2013.01); *G06T 7/246* (2017.01); *G06T 7/60* (2013.01); *H04N 5/2256* (2013.01); *G02B 2027/0138* (2013.01); *G02B 2027/0178* (2013.01); *G02B 2027/0187* (2013.01); *G06T 2207/10152* (2013.01); *G06T 2207/30201* (2013.01)

(58) Field of Classification Search
CPC .... G02B 2027/0138; G02B 2027/0178; G02B 2027/0187; G02B 2027/10152; G02B 2027/30201; H04N 5/2256
USPC .......................................................... 348/78
See application file for complete search history.

(56) References Cited

U.S. PATENT DOCUMENTS

2015/0061995 A1* 3/2015 Gustafsson ............ A61B 3/113
 345/156
2016/0270656 A1* 9/2016 Samec ................. A61B 5/6803
2017/0123526 A1* 5/2017 Trail ...................... A61B 3/113

OTHER PUBLICATIONS

Li et al., "Design of an RGBW Color VGA Rolling and Global Shutter Dynamic and Active-Pixel Vision Sensor", IEEE International Symposium on Circuits and Systems (ISCAS), May 24-27, 2015, pp. 718-721.

\* cited by examiner

APPARATUSES, SYSTEMS, AND METHODS FOR MAPPING A SURFACE OF AN EYE VIA AN EVENT CAMERA

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
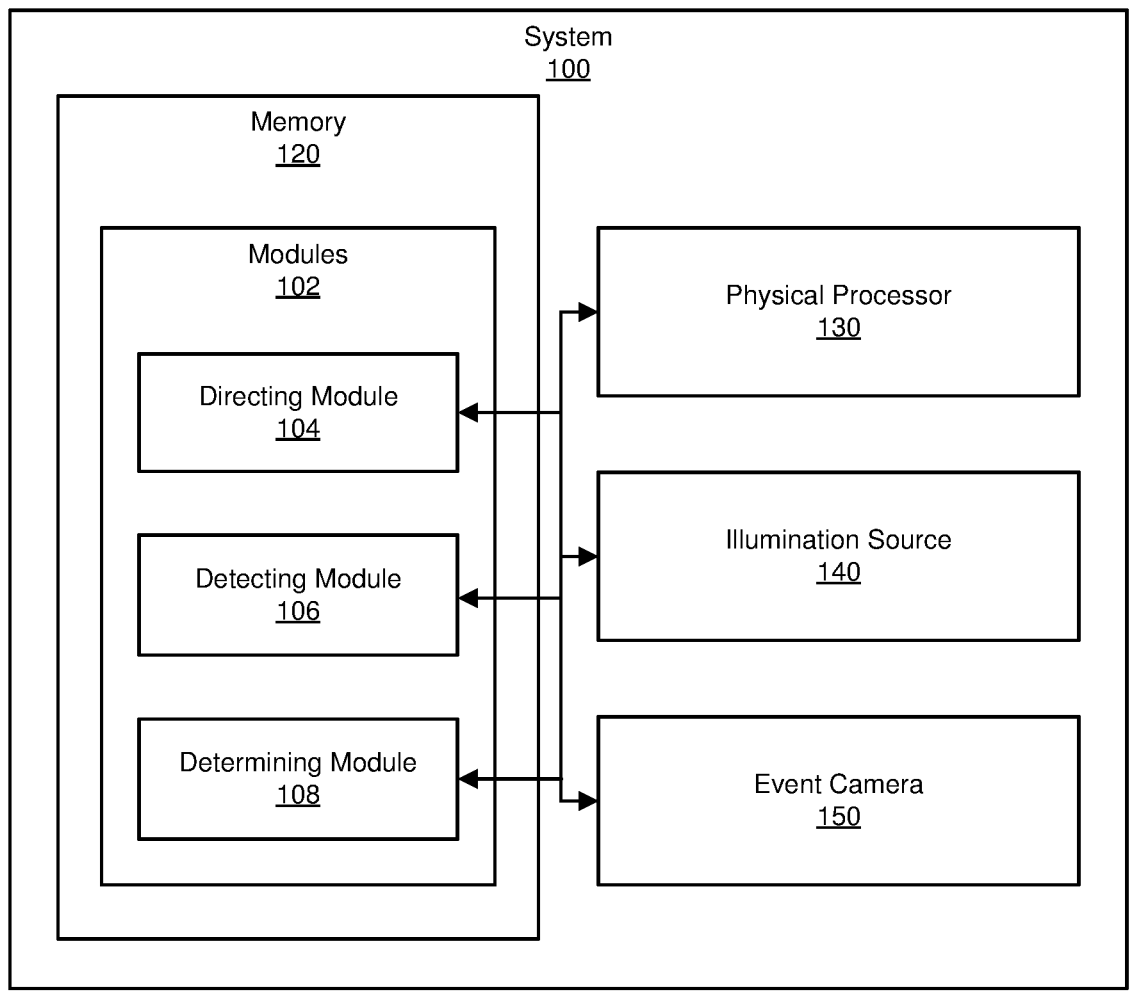
FIG. 1 is a block diagram of an example system for mapping a surface of an eye via an event camera in accordance with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Putting on an artificial reality headset (e.g., a virtual or augmented reality headset) may be the beginning of a thrilling experience, one that may be more immersive than almost any other digital entertainment or simulation experience available today. Such headsets may enable users to travel through space and time, interact with friends in a three-dimensional world, or play video games in a radically redefined way. Artificial reality headsets may also be used for purposes other than recreation. Governments may use them for military training simulations, doctors may use them to practice surgery, and engineers may use them as visualization aids. Artificial reality headsets may also be used for productivity purposes. Information organization, collaboration, and privacy may all be enabled or enhanced through the use of artificial reality headsets.

Unfortunately, conventional artificial reality headsets may have some limitations. For example, conventional artificial reality headsets may be unable to track a gaze of a user so as to identify an object within a real-world or artificial environment that the user may be looking at during a particular moment. This may reduce or inhibit immersiveness of some artificial reality experiences. Furthermore, conventional artificial reality headsets may be limited in biometric data they may gather that may aid in identification of the user and/or customization of artificial reality experiences.

The present disclosure is generally directed to systems and methods for mapping a surface of an eye via an event camera. As will be explained in greater detail below, embodiments of the instant disclosure may direct an illumination source (e.g., an array of illumination elements), positioned at a predetermined position relative to an event camera positioned to receive light from the illumination source reflected by a portion of a cornea of a user during an illumination sequence, to illuminate the portion of the cornea of the user in accordance with the illumination sequence. An embodiment may also detect, via the event camera, a set of events. Each event may include, describe, and/or represent a change in an intensity of light from the illumination source received by a pixel included in the event camera over a sampling period of the event camera.

Moreover, an embodiment may determine a shape of the cornea of the user (e.g., a shape of the anterior surface of the cornea of the user based on the predetermined position of the illumination source relative to the event camera, the illumination sequence (e.g., which portion of light from the illumination source is reflected by the portion of the cornea of the user) and the set of events.

In some embodiments, the illumination source and/or the event camera may be included in a head-mounted display. In such embodiments, the illumination source may be positioned to illuminate the portion of the cornea of the user as the user wears the head-mounted display. Additionally or alternatively, the event camera may be positioned to receive light reflected by the portion of the cornea of the user as the user wears the head-mounted display.

By determining a shape of a surface of an eye of a user, the apparatuses, systems, and methods described herein may enable an artificial reality system (e.g., a virtual reality system and/or an augmented reality system) to effectively track a gaze of a user based on observations of movements of the eye (e.g., the cornea) of the user. Furthermore, the apparatuses, systems, and methods described herein may provide a method of identifying users based on the unique shape of the surface of the user's eyes (e.g., the user's corneas). Moreover, the apparatuses, systems, and methods described herein may aid in detection and/or diagnosis of medical conditions related to a shape of a patient's cornea, such as astigmatism, keratitis, keratoconus, and/or a corneal dystrophy.

The following will provide, with reference to FIGS. 1-2 and 4-11, detailed descriptions of systems for mapping a surface of an eye via an event camera. Detailed descriptions of corresponding computer-implemented methods will also be provided in connection with FIG. 3.

FIG. 1 is a block diagram of an example system 100 for mapping a surface of an eye via an event camera. As illustrated in this figure, example system 100 may include one or more modules 102 for performing one or more tasks. As will be explained in greater detail below, modules 102 may include a directing module 104 that may direct an illumination source positioned at a predetermined position relative to an event camera and configured to illuminate a portion of a cornea of the user in accordance with an illumination sequence. The event camera may be positioned to receive light from the illumination source reflected by the portion of the cornea during the illumination sequence.

As further shown in FIG. 1, example system 100 may also include a detecting module 106 that may detect, via the event camera, a set of events, each event in the set of events comprising a change in an intensity of light received by a pixel included in the event camera over a sampling period during the illumination sequence. Additionally, example system 100 may further include a determining module 108 that may determine a shape of the cornea of the user based on the predetermined position, the illumination sequence, and the set of events.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate mapping of a shape of a cornea. Examples of physical processor 130 may include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 may also include an illumination source 140. As will be described in greater detail below, illumination source 140 may include any suitable illumination source that may illuminate at least a portion of an eye of a user. In some examples, illumination source 140 may include a plurality of illuminator elements (e.g., 2 illuminator elements, 4 illuminator elements, 16 illuminator elements, 100 illuminator elements, etc.). Each illuminator element may be associated with an illumination attribute that may distinguish the illuminator element from other illuminator elements included in the plurality of illuminator elements during an illumination sequence. For example, an illumination attribute may include, without limitation, a pulse time offset (e.g., 1 µs, 10 µs, 100 µs, 1000 µs, etc.), a pulse code (e.g., a pattern of pulses during the illumination sequence), a pulse frequency (e.g., 1 Hz, 100 Hz, 1 kHz, 1 MHz, etc. during the illumination sequence), a polarization, a wavelength (e.g., 1 nm, 10 nm, 100 nm, 1 µm, 100 µm, 1 mm, etc.), combinations of one or more of the same, and so forth. In some examples, illumination source 140 may be separate and distinct from a head-mounted display. In additional or alternative examples, illumination source 140 may be included in (e.g., integrated within, positioned within, physically coupled to, etc.) a head-mounted display.

As further shown in FIG. 1, in some embodiments, example system 100 may also include an event camera 150. Event camera 150 may be positioned to receive light reflected by a portion (e.g., a cornea) of an eye of a user. In some examples, an "event" may include any change greater than a threshold value in one or more qualities of light (e.g., wavelength, brightness, radiance, polarity, luminance, illuminance, luminous intensity, luminous power, spectral exposure, etc.) received by a pixel included in an event camera during a predetermined period (e.g., 1 µs, 10 µs, 100 µs, 1000 µs, etc.). In some examples, an "event camera" may include any sensor that may asynchronously gather and transmit pixel-level data from one or more pixels in an image sensor array that may detect an event during a particular period of time (e.g., 1 µs, 10 µs, 100 µs, 1000 µs, etc.).

In some examples, event camera 150 may include more than one event camera. For example, in one or more embodiments, event camera 150 may include two or more event cameras, one or more global shutter cameras, one or more rolling shutter cameras, and/or one or more suitable photosensors that may each be positioned to receive light reflected by a portion (e.g., a cornea) of an eye of a user. In some examples, each camera included in event camera 150 may have an overlapping field-of-view with one or more other cameras included event camera 150. Additionally, each camera included in event camera 150 may have a different resolution, frame rate, field-of-view, sensitivity to a particular range of the electromagnetic spectrum, and so forth, than one or more additional cameras included in event camera 150.

By way of illustration, in some embodiments, event camera 150 may include a total of four event cameras. In this illustration, two of the event cameras may have an overlapping field-of-view and may be positioned to receive light reflected by a first cornea. Continuing with this illustration, another two event cameras may also have an overlapping field-of-view and may be positioned to receive light reflected by a second cornea.

As another illustration, in some examples, event camera 150 may include two event cameras and two global shutter cameras. In this illustration, one of the event cameras and one of the global shutter cameras may be positioned to receive light reflected by a first cornea. Likewise, the other event camera and the other global-shutter camera may be positioned to receive light reflected by the second cornea. These illustrations are not intended to be limiting, and event camera 150 may include any suitable combination of an event camera and one or more additional event cameras, one or more global shutter cameras, one or more rolling-shutter cameras, and/or any other suitable sensor of light and/or other electromagnetic radiation.

Furthermore, event camera 150 may be communicatively coupled via any suitable data channel to physical processor 130 and/or illumination source 140. In some examples, event camera 150 may be separate and distinct from a head-mounted display. In additional or alternative examples, event camera 150 may be included in (e.g., integrated within, positioned within, physically coupled to, etc.) a head-mounted display.

Figure 2:
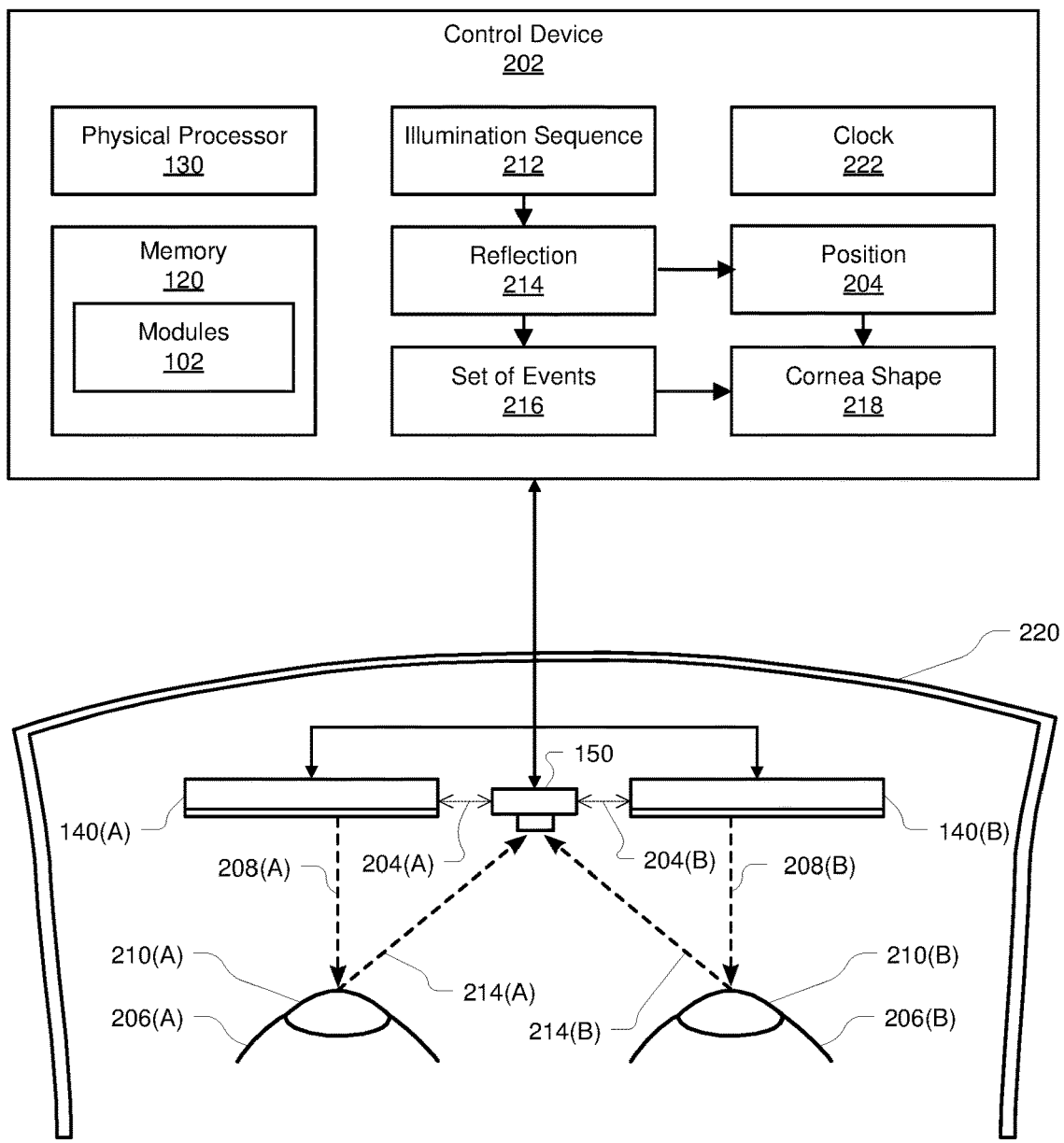
FIG. 2 is a block diagram of an example implementation of a system for mapping a surface of an eye via an event camera in accordance with embodiments of this disclosure.

Example system 100 in FIG. 1 may be implemented in a variety of ways. For example, all or a portion of example system 100 may represent portions of an example system 200 ("system 200") in FIG. 2. As shown in FIG. 2, system 200 may include control device 202. System 200 may also include at least one illumination source 140 (e.g., illumination source 140(A) and illumination source 140(B) in FIG. 2) and at least one event camera 150.

As further shown in FIG. 2, each illumination source 140 may be positioned relative to an event camera (e.g., at a position 204(A) relative to an event camera 150 and/or at a position 204(B) relative to event camera 150). Each illumination source 140 may be configured to illuminate (e.g., via illumination 208(A) and/or illumination 208(B)) a portion of a cornea of the user (e.g., cornea 210(A) of eye 206(A) and/or cornea 210(B) of eye 206(B)) via an illumination sequence (e.g., illumination sequence 212).

Additionally, event camera 150 may be positioned to receive light from an illumination source 140 reflected by the portion of the cornea of the user (e.g., glint 214(A) reflected by cornea 210(A) of eye 206(A) and/or glint 214(B) reflected by cornea 210(B) of eye 206(B)).

Hence, as shown in FIG. 2, illumination source 140(A) may generate, emit, and/or present illumination 208(A) from position 204(A). A portion of cornea 210(A) of eye 206(A) may reflect illumination 208(A) as glint 214(A) towards event camera 150, and event camera 150 may receive glint 214(A). Likewise, illumination source 140(B) may generate, emit, and/or present illumination 208(B) from position 204 (B). A portion of cornea 210(B) of eye 206(B) may reflect illumination 208(B) as glint 214(B) towards event camera 150, and event camera 150 may receive glint 214(B).

In at least one example, control device 202 may be programmed with one or more of modules 102. In at least one embodiment, one or more modules 102 from FIG. 1 may, when executed by control device 202, enable control device 202 to perform one or more operations to map a surface of an eye via an event camera. For example, as will be described in greater detail below, directing module 104 may cause control device 202 to direct an illumination source (e.g., illumination source 140) positioned at a predetermined position (e.g., position 204) relative to an event camera (e.g., event camera 150) and configured to illuminate (e.g., via illumination 208) a portion of a cornea of the user in accordance with an illumination sequence (e.g., illumination sequence 212).

In some embodiments, detecting module 106 may cause control device 202 to detect, via an event camera (e.g., event camera 150) positioned to receive light from the illumination source reflected by the portion of the cornea of the user during the illumination sequence (e.g., glint 214), a set of events (e.g., set of events 216). In some examples, each event in the set of events may include and/or represent a change in an intensity of light from the illumination source (e.g., illumination source 140) received by a pixel include in the event camera over a sampling period of the event camera. Additionally, determining module 108 may cause control device 202 to determine a shape of the cornea of the user (e.g., a cornea shape 218) based on the predetermined position, the illumination sequence, and the set of events.

In some examples, illumination source 140 and/or event camera 150 may be included in a head-mounted display, such as head-mounted display 220. In some examples, as will be described in greater detail below, a "head-mounted display" may include any type or form of display device or system that may be worn on or about a user's head and that may display visual content to the user. Head-mounted displays may display content in any suitable manner, including via a display screen (e.g., an LCD or LED screen), a projector, a cathode ray tube, an optical mixer, a waveguide display, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Various examples of artificial reality systems that may include one or more head-mounted displays may be described in additional detail below in reference to FIGS. 9-11.

Moreover, in some examples, illumination source 140 may be synchronized with a clock of event camera 150, such as a clock 222. This synchronization may facilitate optimization of detection of reflections and/or glints from a cornea of a user of illumination from illumination source 140 by event camera 150.

Control device 202 generally represents any type or form of computing device capable of reading and/or executing computer-executable instructions. Examples of control device 202 include, without limitation, embedded systems, wearable devices (e.g., smart watches, smart glasses, etc.), servers, desktops, laptops, tablets, cellular phones, (e.g., smartphones), personal digital assistants (PDAs), multimedia players, gaming consoles, combinations of one or more of the same, or any other suitable computing device. In some examples, control device 202 may be communicatively coupled to illumination source 140 and event camera 150. In some examples, control device 202 may be included in (e.g., physically integrated as part of) a head-mounted display 220. In additional examples, control device 202 may be physically separate and/or distinct from a head-mounted display 220, and/or may be communicatively coupled to illumination source 140 and/or event camera 150 via any suitable data pathway.

In additional embodiments, as will be described in additional detail below in reference to FIG. 8, head-mounted display 220 may include a waveguide display. In such embodiments, illumination source 140 may be positioned to illuminate a portion of a cornea 210 via an optical pathway of the waveguide display. Additionally or alternatively, event camera 150 may be positioned to receive light reflected by the portion of cornea 210 via the optical pathway of the waveguide display.

In at least one example, control device 202 may include at least one computing device programmed with one or more of modules 102. All or a portion of the functionality of modules 102 may be performed by control device 202 and/or any other suitable computing system. As will be described in greater detail below, one or more of modules 102 from FIG. 1 may, when executed by at least one processor of control device 202, may enable control device 202 to map corneal curvature in one or more of the ways described herein.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
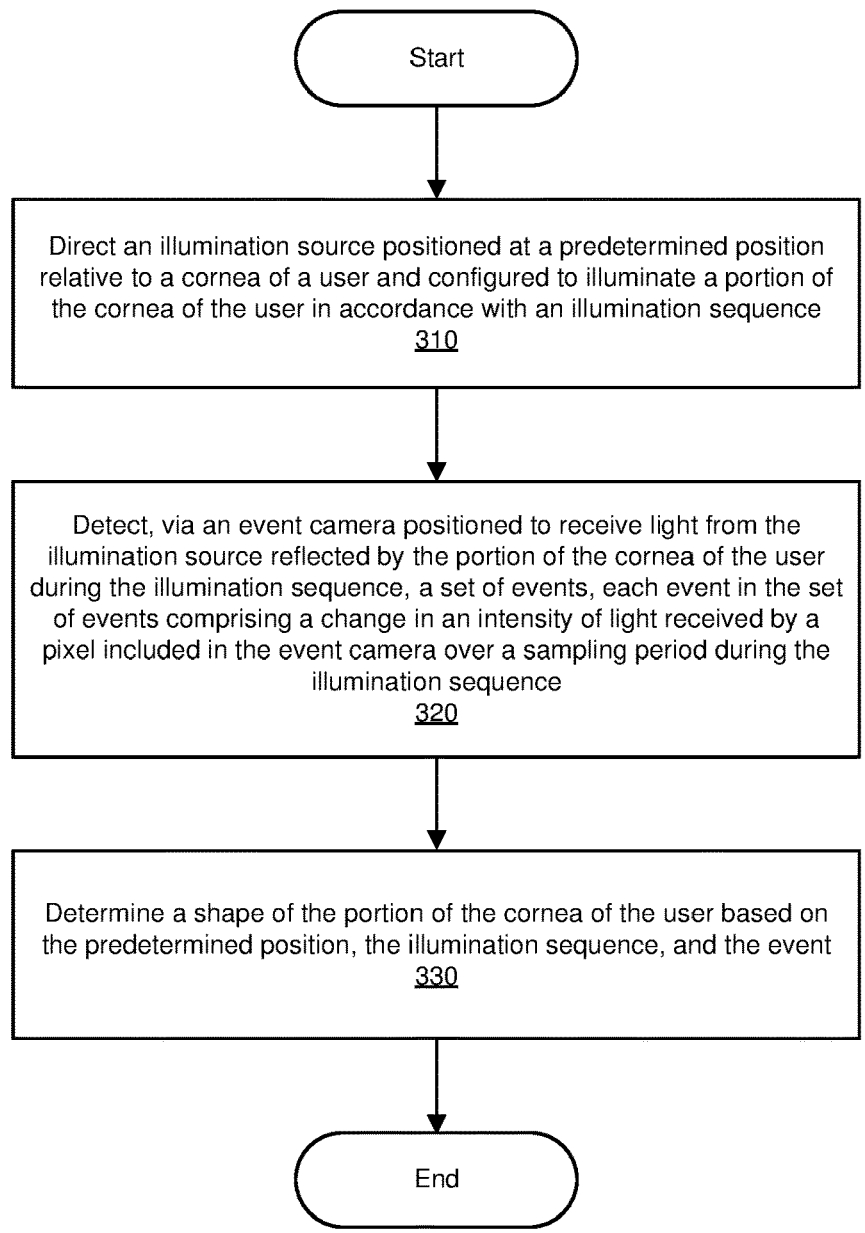
FIG. 3 is a flow diagram of an example method for mapping a surface of an eye via an event camera.

FIG. 3 is a flow diagram of an example computer-implemented method 300 for mapping a surface of an eye via an event camera. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may direct an illumination source, positioned at a predetermined position relative to an event camera positioned to receive light from the illumination source reflected by a portion of a cornea of a user during an illumination sequence, to illuminate a portion of a cornea of the user in accordance with an illumination sequence. For example, directing module 104 may, as part of control device 202, cause control device 202 to direct illumination source 140 positioned at position 204 relative to event camera 150 to illuminate cornea 210 in accordance with illumination sequence 212.

In some examples, an "illumination sequence" may include any temporal or spatial pattern of illumination of a portion of an eye (e.g., a cornea 210 of an eye 206). In some examples, an illumination sequence may describe a sequence of directions that may, when executed, cause illumination source 140 to illuminate a portion of cornea 210 (e.g., cornea 210) in accordance with a temporal or spatial pattern.

Directing module 104 may direct illumination source 140 to illuminate a portion of a cornea 210 in accordance with illumination sequence 212 in a variety of contexts. For example, illumination sequence 212 may direct illumination source 140 to illuminate a portion of cornea 210 at a particular intensity for 1 ms, cease illuminating the portion of cornea 210 for 1 ms, and illuminate cornea 210 again at an additional intensity for 1 ms. Hence, when directing module 104 directs an illumination source 140 to illuminate a portion of cornea 210 in accordance with illumination sequence 212, directing module 104 may direct illumination source 140 to direct light at the portion of cornea 210 at the particular intensity for 1 ms, cease directing light at the portion of cornea 210 at the particular intensity for 1 ms, and direct illumination source 140 to again direct light at the portion of cornea 210 at the additional intensity for 1 ms. Therefore, illumination source 140 may direct light at the portion of cornea 210 at the particular intensity for 1 ms, cease directing light at the portion of cornea 210 at the particular intensity for 1 ms, and again direct light at the portion of cornea 210 at the additional intensity for 1 ms.

This example is merely illustrative, as an illumination sequence may include and/or describe any temporal or spatial variation in any suitable illumination attribute associated with an illumination source 140 including, without limitation, a pulse time, a pulse frequency, a polarization of a portion of illumination source 140, a wavelength of a portion of illumination source 140, an intensity of a portion of illumination source 140, a brightness of a portion of illumination source 140, combinations of one or more of the same, and so forth.

In some examples, as described above, illumination source 140 may include a plurality of illuminator elements (e.g., 2 illuminator elements, 4 illuminator elements, 16 illuminator elements, 100 illuminator elements, etc.). Each illuminator element may be associated with an illumination attribute that may distinguish the illuminator element from other illuminator elements included in the plurality of illuminator elements during an illumination sequence. Hence, in some examples, an illumination sequence may include and/or describe any temporal or spatial variation in any illumination attribute of any illuminator element included in illumination source 140.

Figure 4:
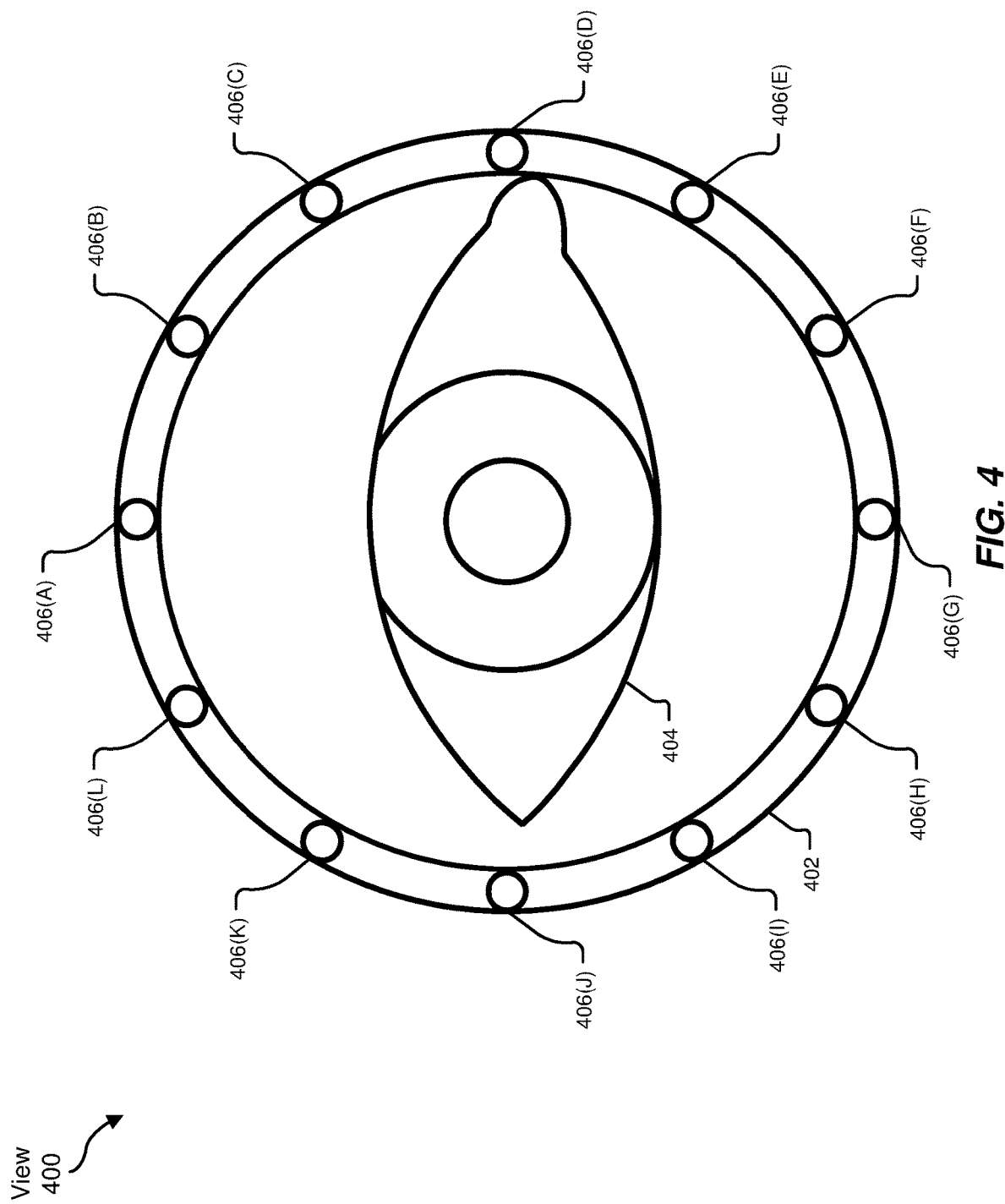
FIG. 4 is an illustration of an illumination source that may be used in connection with embodiments of this disclosure.

By way of illustration, FIG. 4 shows a view 400 of an illumination source that may be used in connection with embodiments of the apparatuses, systems, and methods described herein. Although not shown in FIG. 4, Illumination source 402 may be positioned at a predetermined position relative to an event camera (e.g., event camera 150). Illumination source 402 includes a plurality of illuminator elements 406 (e.g., illuminator element 406(A) through illuminator element 406(L)). Each illuminator element 406 is located at a different predetermined position or location within illumination source 402. Hence, the predetermined position of illumination source 402 relative to the event camera may include, for each illuminator element 406, a different position relative to the event camera.

Furthermore, each illuminator element 406 may include and/or may be associated with an illumination attribute that may distinguish the illuminator element 406 from other illuminator elements 406 during an illumination sequence. For example, each illuminator element 406 may illuminate, when directed during an illumination sequence, with a distinctive pulse time offset, a distinctive pulse code, a distinctive pulse frequency, a distinctive polarization, a distinctive wavelength, combinations of one or more of the same, and so forth An illumination attribute may distinguish an illuminator element 406 from another illuminator element 406. For example, illuminator element 406(A) may illuminate eye 404 with a particular pulse frequency (e.g., 1 Hz, 10 Hz, 100 Hz, 1 kHz, etc.) and illuminator element 406(B) may illuminate with a different pulse frequency (e.g., 2 Hz, 20 Hz, 200 Hz, 2 kHz, etc.). As an additional example, illuminator element 406(C) may illuminate with a particular wavelength (e.g., 800 nm) and illuminator element 406(D) may illuminate with a different wavelength (e.g., 850 nm). These examples are merely illustrative, as any portion of illumination source 140 (e.g., any of illuminator elements 406) may illuminate eye 404 in accordance with any suitable illumination attribute that may serve to distinguish one portion of illumination source 140 from another portion of illumination source 140 during an illumination sequence. Additional examples of illumination sources, illuminator elements, illumination attributes, and/or illumination sequences will be described in additional detail below in reference to FIGS. 5-8.

Returning to FIG. 3, at step 320, one or more of the systems described herein may detect, via the event camera, a set of events, each event in the set of events including and/or representing a change in an intensity of light received by a pixel included in the event camera over a sampling period during the illumination sequence. For example, detecting module 106 may, as part of control device 202, cause control device 202 to detect, via event camera 150 positioned to receive glint 214, set of events 216. Each event in set of events 216 may include and/or represent a change in an intensity of light received by a pixel included in the event camera over a sampling period during illumination sequence 212. In some examples, a "glint" may include a reflection from an outer (e.g., anterior) surface of a cornea, such as a first Purkinje image (P1) that may include a reflection from the outer surface of the cornea.

As noted above, event camera 150 may be positioned to receive light reflected by a portion of an eye (e.g., a cornea 210 of eye 206). In some embodiments, event camera 150 may be separate and distinct from a head-mounted display (e.g., head-mounted display 220). In additional or alternative embodiments, event camera 150 may be included as part of head-mounted display 220. For example, as shown in FIG. 2, event camera 150 may be included in head-mounted display 220, such as disposed within a cavity or void formed by a housing of head-mounted display 220 and through which light reflected by cornea 210 may pass. In such examples, event camera 150 may receive light reflected by cornea 210 via the void or cavity formed by the housing of head-mounted display 220.

In additional or alternative embodiments, as will be described in greater detail below in reference to FIG. 8, event camera 150 may be positioned to receive light (e.g., light from illumination source 140) reflected by a portion of an eye (e.g., cornea 210) via an optical pathway of a waveguide display. For example, as described above, and as will be described in greater detail below in reference to FIG. 8, event camera 150 may be positioned such that light reflected by a cornea 210 may pass through and/or be conducted by a waveguide to a position where event camera 150 may receive the reflected light.

Detecting module 106 may detect set of events 216 in a variety of contexts. For example, as described above, directing module 104 may direct illumination source 140 to illuminate (e.g., via illumination 208) a portion of an eye 206 in accordance with illumination sequence 212. Light included in illumination 208 may be reflected by a portion of cornea 210 (e.g., as glint 214), and detecting module 106 may detect, via event camera 150, set of events 216 by receiving data from event camera 150 that may be representative of glint 214 received, detected, and translated into set of events 216 by event camera 150.

Figure 5:
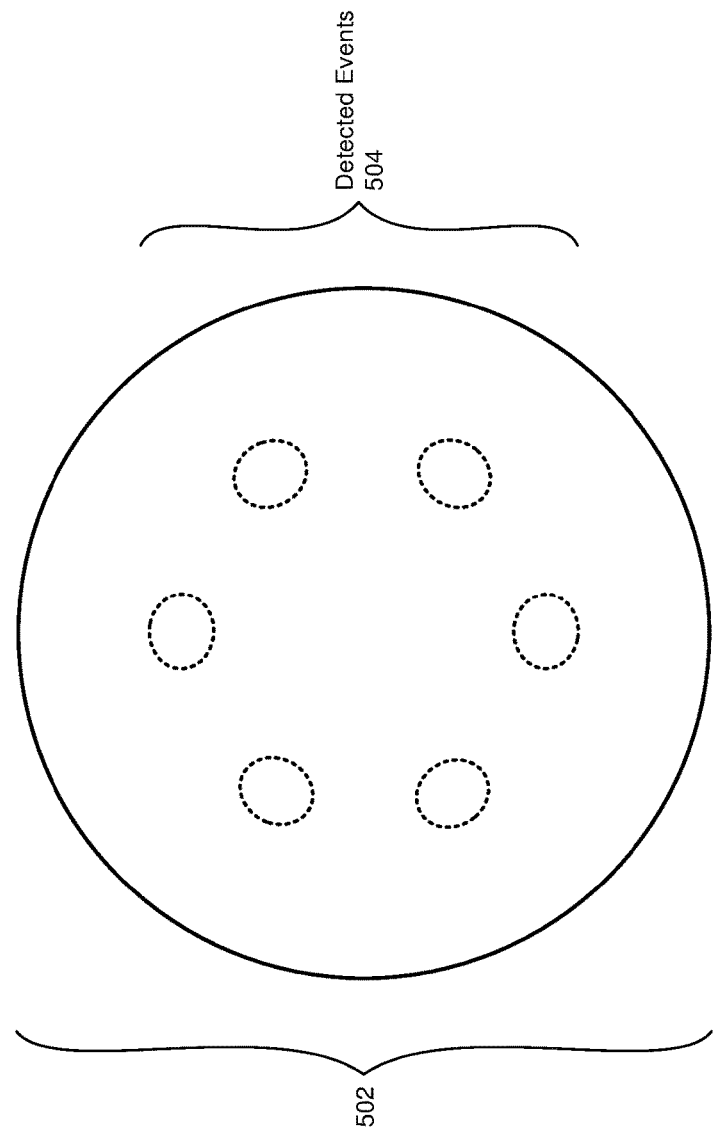
FIGS. 5-7 are illustrations of surfaces of eyes of users illuminated and/or mapped in accordance with embodiments of this disclosure.

By way of illustration, FIG. 5 includes a view 500 of a set of events detected by detecting module 106. As shown, directing module 104 may direct an illumination source (e.g., illumination source 140) to illuminate (e.g., via illumination 208) a portion of cornea 502 in accordance with an illumination sequence. For example, directing module 104 may direct illumination source 402 to illuminate cornea 502 in accordance with an illumination sequence that directs illumination source 402 to illuminate cornea 502 using illuminator element 406(A), illuminator element 406(C), illuminator element 406(C), illuminator element 406(E), illuminator element 406(G), illuminator element 406(I), and illuminator element 406(K).

As illumination source 402 illuminates cornea 502, a portion of the illumination provided by illumination source 402 may encounter and reflect off of a tear film-air interface of cornea 502. Event camera 150 may receive the reflected light and may detect and/or translate the received reflected light into detected events 504. Event camera 150 may transmit data representative of detected events 504 to detecting module 106. Hence, in some examples, detecting module 106 may detect a set of events by receiving data representative of the set of events from event camera 150.

As described above, each illuminator element 406 may illuminate cornea 502 using a different illumination attribute, such as a pulse time offset, a pulse code, a wavelength, and so forth. Hence, one or more of modules 102 (e.g., detecting module 106, determining module 108, etc.) may distinguish events included in a set of events detected by detecting module 106 via event camera 150 that may have been caused by one illuminator element (e.g., illuminator element 406(I)) from events included in the set of events that may have been caused by a second illuminator element (e.g., illuminator element 406(K)). Furthermore, one or more of modules 102 (e.g., detecting module 106, determining module 108, etc.) may identify events included in a set of events detected by detecting module 106 via event camera 150 that may have been caused by a particular illuminator element included in a plurality of illuminator elements (e.g., events caused by light from illuminator element 406(A), events caused by light from illuminator element 406(B), events caused by light from illuminator element 406(C), etc.).

Figure 6:
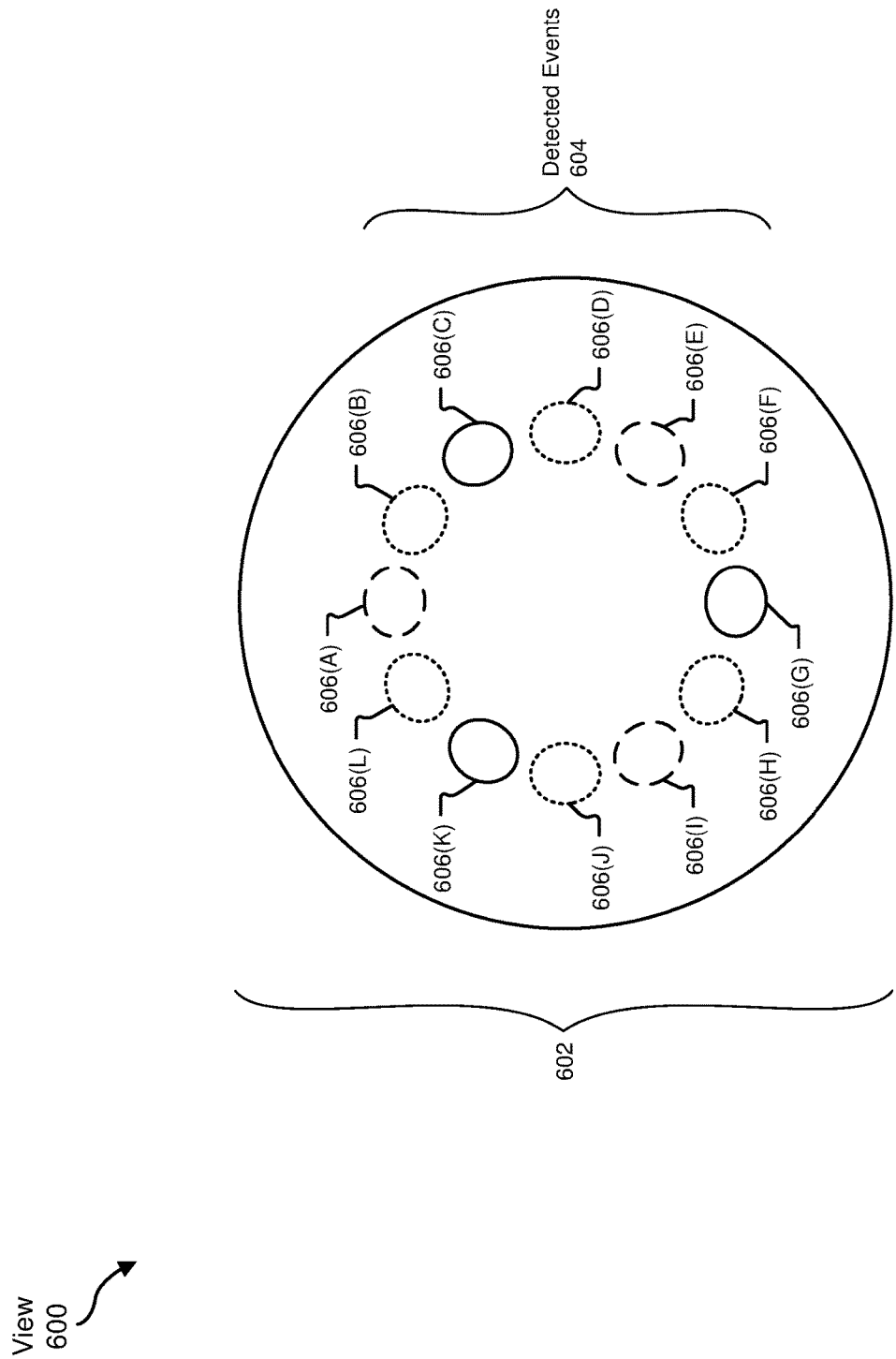

Illumination source 140 may use any suitable number of illuminator elements, any suitable illumination attributes, and/or any suitable illumination sequence to illuminate a portion of an eye of a user. As another illustration, FIG. 6 shows a view 600 of a set of events detected by an event camera (e.g., event camera 150). In this example, illumination source 402 has illuminated cornea 602 in accordance with an additional illumination sequence. In this additional illumination sequence, each illuminator element 406 (e.g., each of illuminator element 406(A) to illuminator element 406(J)) may illuminate cornea 602 with a different illumination attribute, and event camera 150 may receive light from each illuminator element reflected by cornea 602 (e.g., a tear film-air interface of cornea 602). Event camera 150 may detect and/or translate the received reflected light into detected events 604.

As shown, detected events 604 may include one or more sets of events 606 that may be associated with light from particular illuminator elements 406. For example, set of events 606(A) may be associated with light from illuminator element 406(A), set of events 606(B) may be associated with light from illuminator element 406(B), and so forth. Hence, detecting module 106 may detect light from illuminator element 406(A) reflected by cornea 602 by receiving set of events 606(A) from event camera 150, detecting module 106 may detect light from illuminator element 406(B) reflected by cornea 602 by receiving set of events 606(B) from event camera 150, and so forth.

Returning to FIG. 3, at step 330, one or more of the systems described herein may determine a shape of the cornea of the user based on (1) a predetermined position of an illumination source relative to an event camera, (2) an illumination sequence, and (3) a set of events. For example, determining module 108 may, as part of control device 202, cause control device 202 to determine a cornea shape 218 of a cornea 210 of an eye 206 based on a predetermined position of illumination source 140 relative to event camera 150 (e.g., position 204), illumination sequence 212, and set of events 216.

As illumination source 140 illuminates cornea 210 with illumination 208, some of the light may be reflected off the tear film-air interface like a mirror (e.g., as glint 214). The pattern or shape of the reflected light may indicate a shape of an anterior surface of the portion of cornea 210 illuminated by illumination source 140. Furthermore, as described above, an angle of reflection of the reflected light may indicate a shape of the anterior surface of the portion of cornea 210 illuminated by illumination source 140. Hence, determining module 108 may determine a shape of cornea 210 based on position 204, illumination sequence 212, and set of events 216.

Determining module 108 may determine cornea shape 218 of cornea 210 in a variety of contexts. For example, as described above, one or more of modules 102 (e.g., determining module 108) may identify events included in set of events 216 that may have been caused by light originating from a particular portion of illumination source 140 (e.g., a particular illuminator element). Based on a predetermined position of illumination source 140 and/or an illumination element included in illumination source 140 that may have generated the light detected by event camera 150 and a predetermined position of illumination source 140 relative to event camera 150, determining module 108 may determine an angle of reflection of the light reflected by a tear-film interface of cornea 210. The angle of reflection may indicate a shape of an anterior surface of cornea 210 that may have reflected the illumination from illumination source 140. Hence, determining module 108 may determine a shape of a portion of an eye illuminated by illumination source 140 based on the predetermined position of illumination source 140, the illumination sequence (e.g., when illumination source 140 illuminated the portion of the eye), and a set of events generated by event camera 150.

In additional or alternative embodiments, determining module 108 may determine cornea shape 218 of cornea 210 by identifying one or more physical features of cornea 210 from set of events 216, tracking change in position of the one or more physical features of cornea 210 during the illumination sequence, and determining the shape the cornea based on the change in position of the one or more physical features of cornea 210 during the illumination sequence.

For example, during a first time period of illumination sequence 212, event camera 150 may detect and/or generate a first event included in set of events 216. Determining module 108 may identify a physical feature of cornea 210 based on the first event, such as a visually distinct and/or identifiable pattern in the corneal epithelium of cornea 210. During a second time period of illumination sequence 212, event camera 150 may detect and/or generate a second event included in set of events 216. Determining module 108 may identify the physical feature of cornea 210 based on the second event and may determine a change in position of the physical feature of cornea 210, such as a translation in one or more dimensions in space of the physical feature, over the time from the first time period of illumination sequence 212 to the second time period of illumination sequence 212. Determining module 108 may then determine a shape of a portion of cornea 210 based on the determined change in position of the physical feature during illumination sequence 212.

In some examples, as described above, illumination source 140 may include a plurality of illuminator elements. In such examples, the predetermined position of illumination source 140 relative to event camera 150 may include, for each illuminator element included in the plurality of illuminator elements, a different position relative to event camera 150. Hence, in some of these examples, determining module 108 may determine cornea shape 218 based on each different position relative to event camera 150 of illuminator elements that provide illumination during an illumination sequence. For example, returning to FIGS. 4 and 6, determining module 108 may determine a shape of cornea 602 based on the predetermined positions of illuminator elements 406 (e.g., illuminator element 406(A) through illuminator element 406(L)) relative to an event camera (e.g., event camera 150).

Furthermore, as described above, each illuminator element included in illumination source 140 may be associated with an illumination attribute that may distinguish the illuminator element from other illuminator elements included in the plurality of illuminator elements during the illumination sequence. Hence, in some examples, determining module 108 may determine cornea shape 218 by (1) detecting at least one illumination attribute associated with at least one illuminator element included in the plurality of illuminator elements that at least partially caused an event included in the set of events, and (2) identifying the illuminator element based on the illumination attribute associated with the illuminator element that at least partially caused the event included in the set of events.

As an illustration, returning to FIG. 6, detecting module 106 may receive set of events 606(A) from event camera 150. Determining module 108 (e.g., via event camera 150) may detect that an illuminator element having a wavelength of 850 nm caused an event included in set of events 606(A). Light emitted by illuminator element 406(A) may have an associated illumination attribute of a wavelength of 850 nm. Thus, determining module 108 may identify illuminator element 406(A) as having emitted light that at least partially caused an event included in set of events 606(A). In such examples, determining module 108 may determine cornea shape 218 based on the predetermined position of illuminator element 406(A), which may provide greater resolution and/or accuracy of a determination of cornea shape 218 than a predetermined position of illumination source 402.

In some examples, determining module 108 may determine cornea shape 218 of cornea 210 by generating a map of cornea 210 based on the predetermined position of illumination source 140 relative to event camera 150 (e.g., position 204), illumination sequence 212, and set of events 216. For example, as noted above, directing module 104 may direct illumination source 140 to illuminate cornea 210 with various illuminator elements during the illumination sequence, and detecting module 106 may detect sets of events caused by each illuminator element during the illumination sequence. Light from each illuminator element may reflect off of a different part of cornea 210 and determining module 108 may determine a shape of each part as described above (e.g., by determining an angle of reflection of the light emitted by an illuminator element). Determining module 108 may generate a map of cornea 210 by aggregating the determined shapes of the parts of cornea 210 into a map of cornea 210.

In some examples, determining module 108 may identify one or more image features of an event-based image of cornea 210 based on set of events 216. In some examples, an "image feature" may include any identifiable portion of an event-based image that may be relevant for an identification process to identify a particular cornea within a set of corneas (i.e., to identify a cornea 210 within a set of corneas). In some examples, image features may include specific structures included in and/or identified based on pixel data included in an event-based image of cornea 210, such as points, edges, lines, junctions, or objects. Additionally or alternatively, a feature may be described in terms of properties of a region of an event-based image (e.g., a "blob"), a boundary between such regions, and/or may include a result of a feature detection algorithm applied to a set of data that describes a shape of a cornea 210 (e.g., an event-based image of a cornea 210 of eye 206).

Examples of feature detection algorithms may include, without limitation, a Gabor filter, Hough transform, Harris corner detection, Features From Accelerated Segment Test (FAST), Laplacian of Gaussian, Difference of Gaussians, Determinant of Hessian, Maximally Stable Extremal Regions (MSER), Principal Curvature-Based Region Detector (PCBR), Gradient Location and Orientation Histogram (GLOH), intensity-based detectors, structure-based detectors, variations or combinations of one or more of the same, and so forth.

Figure 7:
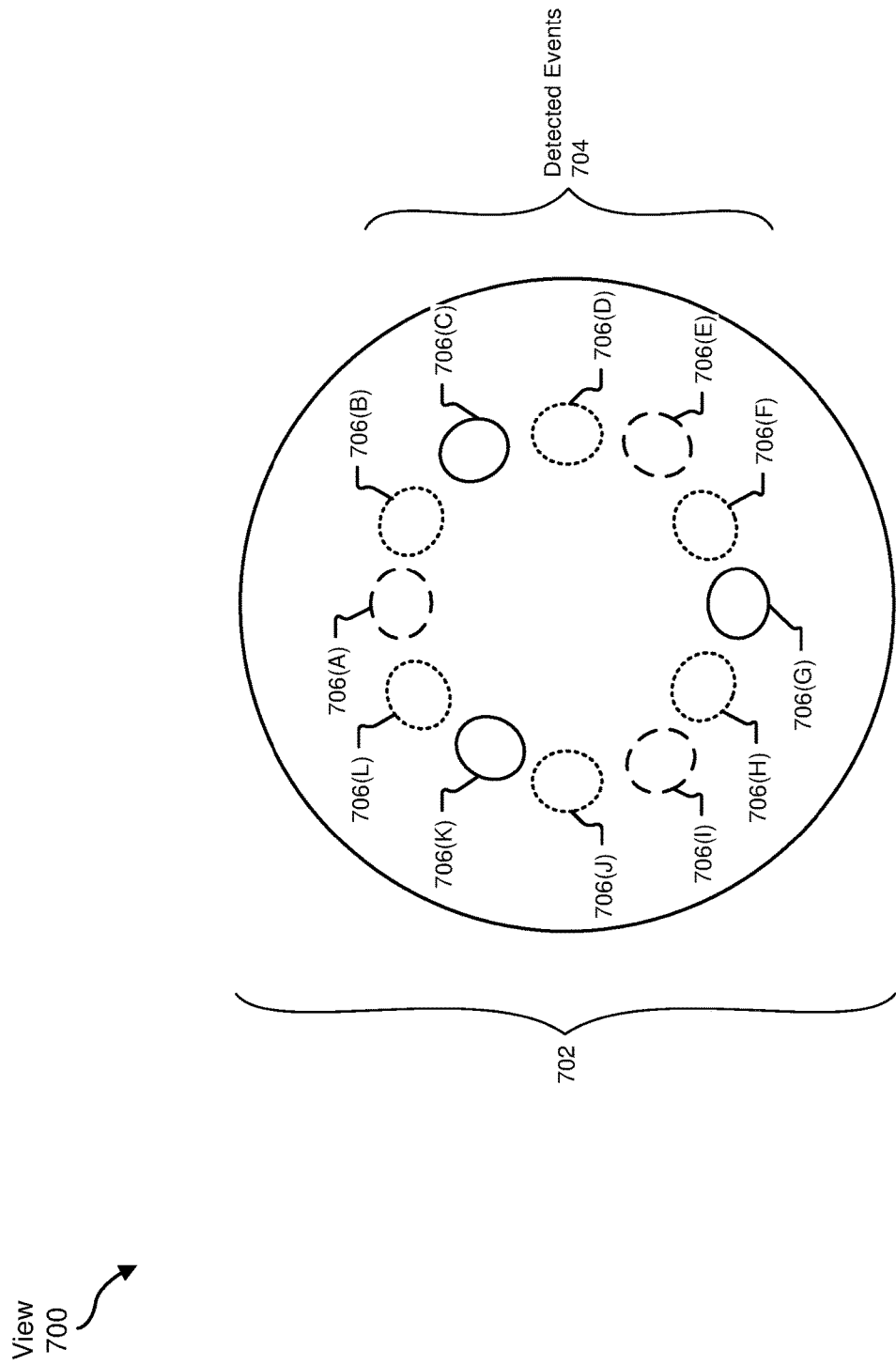

Individual corneas may have biometric characteristics that may distinguish one cornea from another. For example, FIG. 7 shows a view 700 of an additional cornea 702 that may have a different shape (e.g., a different topology) than cornea 602. The apparatuses, systems, and methods described herein may be used to determine a shape of cornea 702. For example, directing module 104 may direct an illumination source (e.g., illumination source 402) to illuminate one or more portions of cornea 702. Detecting module 106 may detect, via an event camera (e.g., event camera 150), a set of events representative of changes in intensity of light from the illumination source received by pixels included in the event camera over a sampling period of the event camera. Determining module 108 may then determine a shape of cornea 702 based on a predetermined position of the illumination source relative to the event camera, the illumination sequence (e.g., information associated with when and how the illumination source illuminated portions of cornea 702), and the set of events.

As shown, detected events 704 may include one or more sets of events 706 that may be associated with light from particular illuminator elements 406. For example, set of events 706(A) may be associated with light from illuminator element 406(A), set of events 706(B) may be associated with light from illuminator element 406(B), and so forth. Hence, detecting module 106 may detect light from illuminator element 406(A) reflected by cornea 702 by receiving set of events 706(A) from event camera 150, detecting module 106 may detect light from illuminator element 406(B) reflected by cornea 702 by receiving set of events 706(B) from event camera 150, and so forth.

As may be apparent via a comparison of detected events 604 and detected events 704 and/or a comparison of sets of events 606 with sets of events 706 (e.g., set of events 706(A) through set of events 706(L)) may have a different shape (e.g., a different topology) from cornea 702. Determining module 108 may identify this difference and, based on this difference, determining module 108 may identify cornea 702 as being a different cornea than cornea 602.

In additional or alternative examples, embodiments of the apparatuses, systems, and methods described herein may identify a user based on a shape of the user's cornea. For example, as described above, determining module 108 may determine a shape of a cornea 210 based on a predetermined position of an illumination source relative to an event camera (e.g., event camera 150), an illumination sequence, and a set of events. One or more of modules 102 (e.g., determining module 108) may then compare the shape of cornea 210 to a set of predetermined cornea shapes (e.g., a set of pre-mapped cornea shapes) that may be associated with one or more users. Based on that comparison, one or more of modules 102 (e.g., determining module 108) may identify a user associated with cornea 210.

Determining module 108 may compare the shape of cornea 210 to the set of predetermined cornea shapes in any suitable way. For example, as described above as part of the process of determining cornea shape 218 of cornea 210, determining module 108 may identify one or physical features of a cornea and/or image features included in an event-based image of cornea 210. Determining module 108 may compare the identified features with features associated with one or more predetermined cornea shapes. Determining module 108 may then identify a cornea from the one or more predetermined cornea shapes that may share one or more image features and/or physical features with cornea shape 218. Based on this identification of the cornea from the one or more predetermined cornea shapes, determining module 108 may identify a user associated with the identified cornea, and may therefore identify a user associated with cornea 210.

In additional embodiments, determining module 108 may determine cornea shape 218 by identifying the user based on the predetermined position of illumination source 140 relative to event camera 150, illumination sequence 212, and set of events 216. Determining module 108 may then, based on the identification of the user, determine cornea shape 218 by accessing (e.g., from any suitable data storage device in communication with control device 202) information representative of a pre-generated map of cornea shape 218.

For example, determining module 108 may determine a shape of a part of cornea 210 that may be biometrically identifiable and/or unique to the user in any of the ways described herein, and may identify the user based on the shape of the part of cornea 210. Additionally or alternatively, determining module 108 may identify the user based on biometrically identifiable features unique to the user that may be included in and/or derivable from set of events 216, such as an event-based image and/or events associated with one or more biometrically identifiable features of eye 206 (e.g., an event-based image of an iris of eye 206, an event-based image of cornea 210, etc.).

Determining module 108 may then, based on the identification of the user, determine cornea shape 218 by accessing (e.g., from any suitable data storage device in communication with control device 202 such as memory 120) information representative of a pre-generated map of cornea shape 218. As will be described in additional detail below, in some examples, determining module 108 may transition from a mapping mode to a tracking mode once determining module 108 identifies the user and accesses information representative of a pre-generated map of cornea 210.

In some examples, embodiments of the apparatuses, systems, and methods described herein may include and/or may enable additional functions. For example, in at least one embodiment, one or more of modules 102 (e.g., directing module 104, detecting module 106, identifying module 108, and/or determining module 108) may track a motion an eye of a user (e.g., eye 206) based on a shape of a portion of the cornea of the user (e.g., cornea shape 218).

One or more of modules 102 may track a motion of an eye 206 in a variety of contexts. For example, in accordance with the operations described above, determining module 108 may determine an initial shape of a cornea (e.g., cornea 210). Directing module 104 may then direct illumination source 140 to again illuminate the portion of cornea 210 in accordance with an illumination sequence. Detecting module 106 may then further detect, via event camera 150, an additional set of events. Determining module 108 may then determine an additional shape of an additional portion of cornea 210 based on the predetermined position of illumination source 140 relative to event camera 150, the illumination sequence, and the additional set of events.

Determining module 108 may then compare the additional shape to the initial shape and, based on the comparison, determine a change in a position of eye 206 and/or cornea 210. The change of position of eye 206 and/or cornea 210 may indicate a motion of eye 206 and/or cornea 210. One or more components of example system 100 and/or example system 200 may execute this process with any suitable frequency (e.g., 1 time per second, 10 times per second, 100 times per second, etc.) to track a motion of eye 206.

In at least some examples, one or more of modules 102 (e.g., directing module 104, detecting module 106, determining module 108, etc.) may detect a deviation in the shape of the cornea of the user. Based on such a detected deviation, one or more of modules 102 (e.g., directing module 104, detecting module 106, determining module 108, etc.) may adjust a calibration value associated with one or more components of system 100 and/or system 200, such as a calibration value associated with illumination source 140, a calibration value associated with event camera 150, and/or a calibration value associated with control device 202.

For example, determining module 108 may determine a shape of a cornea of a user (e.g., cornea 210) in any of the ways described herein, and may compare the determined shape of the cornea of the user with a pre-mapped representation of the shape of the cornea. Based on this comparison with the pre-mapped representation of the shape of the cornea, determining module 108 may detect, identify, locate, and/or otherwise determine a deviation in the detected shape of the cornea. Rather than indicating a true shape of the cornea (e.g., a change in the shape of the cornea after the initial mapping of the cornea), such a deviation may indicate a miscalibration of one or more of the components of system 100 and/or system 200, such as a clock speed of control device 202, a sample rate of event camera 150, an illumination level of illumination source 140, and so forth. Determining module 108 may then adjust a calibration value associated with one or more components of system 100 and/or system 200 to compensate for the miscalibration. Suitable calibration values that determining module 108 may adjust may include, without limitation, an illumination sequence (e.g., an illumination level included in an illumination sequence) associated with at least a portion of illumination source 140, a sample rate of event camera 150, a computing resource of control device 202, combinations of one or more of the same, and so forth.

By way of illustration, as described above, determining module 108 may determine cornea shape 218 of cornea 210. Determining module 108 may then compare cornea shape 218 with a predetermined shape of cornea 210, such as a portion of a pre-generated map of cornea 210. Based on this comparison, determining module 108 may determine that cornea shape 218 deviates from the predetermined cornea shape of cornea 210 in such a way that may indicate that a sample rate of event camera 150 may be lower than a level that may produce a sufficient number of events to accurately determine a shape of cornea 210. In response, determining module 108 may increase a sample rate of event camera 150. Determining module 108 may then determine cornea shape 218 again and compare determined cornea shape 218 to the predetermined cornea shape a second time. Based on this second comparison, determining module 108 may determine that cornea shape 218 is within a predetermined threshold of similarity to the predetermined cornea shape. Thus, by adjusting the sample rate of event camera 150, determining module 108 may compensate for a miscalibration of event camera 150 and/or may re-calibrate event camera 150.

Similarly, in some embodiments, one or more of modules 102 (e.g., directing module 104, detecting module 106, determining module 108, etc.) may balance resources of system 100 and/or system 200 to optimize the functions of system 100 and/or system 200. For example, one or more of modules 102 (e.g., directing module 104, detecting module 106, determining module 108, etc.) may determine a source amount of electrical power available to illumination source 140, event camera 150, and/or control device 202, a system power requirement, and/or a system bandwidth availability. One or more of modules 102 (e.g., directing module 104, detecting module 106, determining module 108, etc.) may then adjust, based on the source amount of electrical power, the system power requirement, and the system bandwidth availability, an illumination sequence, a sample rate of event camera 150, and/or a computing resource of the computing device.

In some examples, a "system power requirement" may include, without limitation, an illumination electrical power requirement of an illumination source (e.g., an amount of electrical power required for illumination source 140 to illuminate a cornea of a user in accordance with an illumination sequence), a detection electrical power requirement of an event camera (e.g., an amount of electrical power required for event camera 150 to detect and/or generate set of events 216), a control electrical power requirement of a control device (e.g., an amount of electrical power required for control device 202 to execute the operations of modules 102), and so forth.

Additionally, in some examples, a "system bandwidth availability" may include, without limitation, an illumination bandwidth of an illumination source (e.g., a data bandwidth of directing module 104), a detection bandwidth of an event camera (e.g., a data bandwidth of event camera 150), a computing bandwidth of a control device (e.g., a data bandwidth of control device 202), and so forth.

One or more of modules 102 may determine the source amount of electrical power, the system bandwidth availability, and/or the system bandwidth availability in any suitable way. For example, determining module 108 may monitor one or more electrical power sensors that may be associated with one or more power sources of one or more components of system 100 and/or system 200. Determining module 108 may also monitor electrical power consumed by each of illumination source 140, event camera 150, and/or control device 202 before, during, and/or after an illumination sequence, as well as events detected and/or generated by event camera 150 as a result of the illumination sequence. Determining module 108 may identify a ratio of events detected and/or generated by event camera 150 to electrical power available to and/or consumed by system 100 and/or system 200.

Likewise, determining module 108 may also monitor bandwidth resources available to and/or consumed by illumination source 140, event camera 150, and/or control device 202 before, during, and/or after an illumination sequence, as well as events detected and/or generated by event camera 150 as a result of the illumination sequence. Determining module 108 may identify a ratio of events detected and/or generated by event camera 150 to bandwidth available to and/or consumed by the components of system 100 and/or system 200 during the illumination sequence.

In some examples, determining module 108 may adjust the illumination sequence, a sample rate of event camera 150, and/or a computing resource of control device 202 to optimize the ratio of events detected and/or generated by event camera 150 to electrical power available to and/or consumed by system 100 and/or 200 before, during, and/or after the illumination sequence. Additionally, determining module 108 may adjust the illumination sequence, a sample rate of event camera 150, and/or a computing resource of control device 202 to optimize the ratio of events detected and/or generated by event camera 150 to bandwidth available to and/or consumed by system 100 and/or 200 during the illumination sequence. Hence, one or more of modules 102 may balance resources of system 100 and/or system 200 to optimize the functions of system 100 and/or system 200.

In additional or alternative embodiments, one or more of modules 102 (e.g., determining module 108) may determine, based on cornea shape 218, a condition associated with cornea 210, such as astigmatism, keratitis, keratoconus, and/or a cornea dystrophy. For example, a predetermined cornea shape may be associated with one or more conditions of a cornea. One or more of modules 102 (e.g., determining module 108) may compare cornea shape 218 to one or more predetermined cornea shapes (e.g., via any suitable comparison method) that may indicate one or more corneal conditions. When one or more of modules 102 (e.g., determining module 108) determines that cornea shape 218 is within a threshold degree of similarity to a predetermined cornea shape that may indicate a particular condition, determining module 108 may determine that cornea 210 has a shape associated with the particular condition. Hence, one or more of modules 102 may determine that cornea 210 exhibits the particular condition.

As mentioned above, in some examples, illumination source 140 and/or event camera 150 may be included in a head-mounted display 220. Additionally, in some examples, head-mounted display 220 may include a waveguide display. In some examples, illumination source 140 may illuminate eye 206 via an optical pathway of the waveguide display and/or event camera 150 may receive light reflected by cornea 210 via the optical pathway of the waveguide display.

Figure 8:
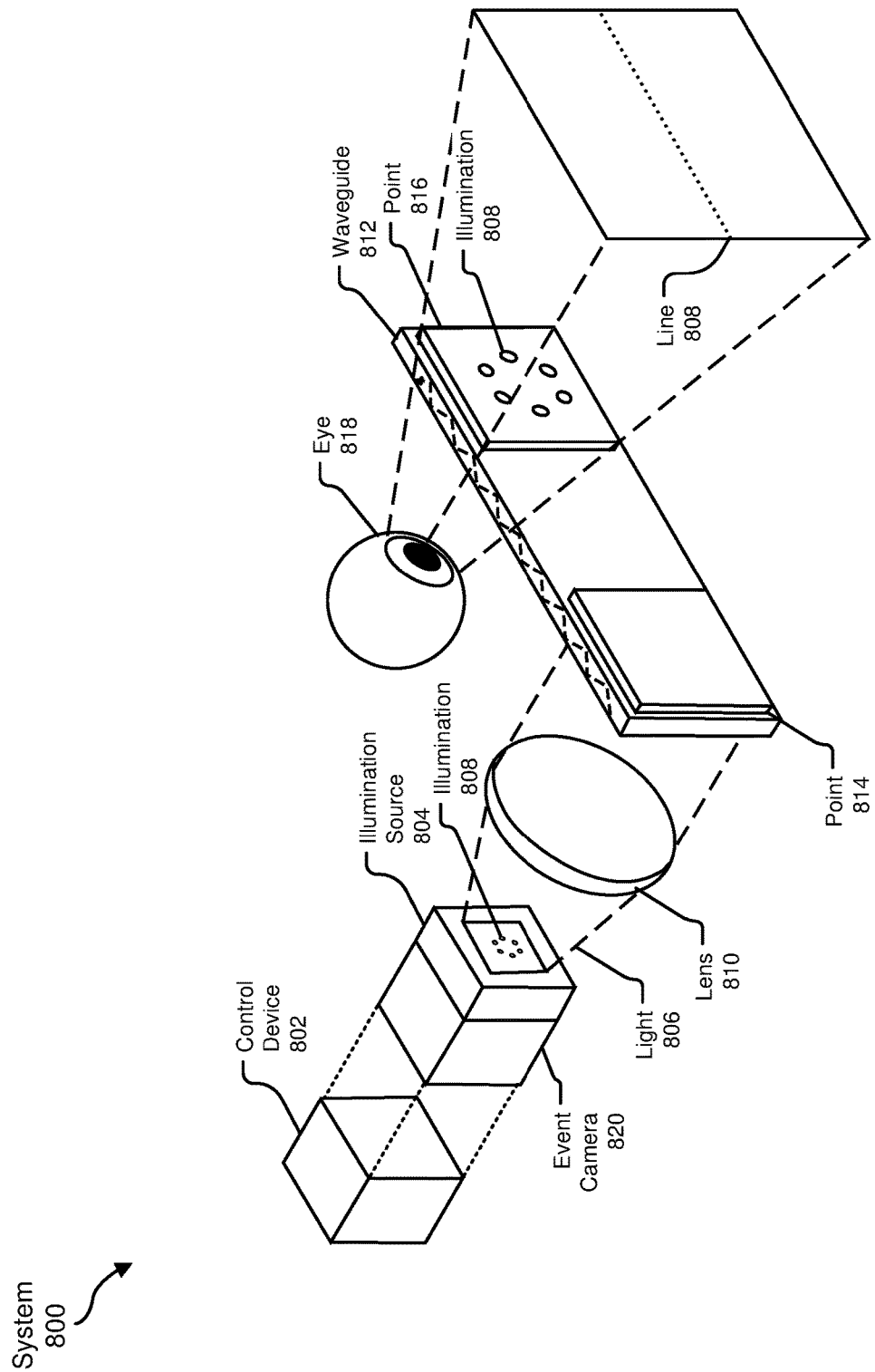
FIG. 8 is an illustration of a waveguide display in accordance with embodiments of this disclosure.

To illustrate, FIG. 8 is a block diagram of an example system 800 that includes a waveguide display. As shown, example system 800 includes a control device 802 that may perform any of the operations described herein that may be associated with control device 202. Example system 800 may also include an illumination source 804 that may include any of the illumination sources included herein. For example, illumination source 804 may include a plurality of illuminator elements. In some examples, illumination source 804 may include an infrared light source, such as an infrared vertical-cavity surface-emitting laser (VCSEL), and a micro-electro-mechanical system (MEMS) micromirror device that may be configured to scan the infrared light source across a surface (e.g., a portion of a cornea).

Illumination source 804 may generate and/or produce light 806 that may include an illumination sequence 808 ("illumination 808" in FIG. 8). Illumination source 804 may be positioned to direct light 806 and/or illumination sequence 808 to a lens 810, which may represent one or more optical elements that may direct light 806 into waveguide 812. Waveguide 812 may include any suitable waveguide that may guide waves in a portion of the electromagnetic spectrum from a first point (e.g., point 814) to a second point (e.g., point 816) via any suitable mechanism, such as internal reflection, Bragg reflection, and so forth. Hence, waveguide 812 may guide light from point 814 to point 816 and/or from point 816 to point 814. Light may exit waveguide 812 at point 816, and waveguide 812 and/or any other suitable optical elements (e.g., a combiner lens) may direct the light towards an eye of a user, such as eye 818. Likewise, light may exit waveguide 812 at point 814, and waveguide 812 may direct the exiting light toward an event camera 820 (e.g., via lens 810).

Hence, directing module 104 may direct illumination source 804 to illuminate a portion of an eye of a user in accordance with illumination sequence 808. Illumination source 804 may direct the illumination (e.g., light 806) toward point 814 of waveguide 812. Light 806 that includes the illumination sequence (e.g., light 806 that may illumination sequence 808) may enter waveguide 812, and waveguide 812 may guide the light toward point 816. Upon exiting waveguide 812 at point 816, light 806 may illuminate at least a portion of eye 818 in accordance with illumination sequence 808. In some examples, a predetermined position associated with illumination source 804 may be associated on a point where light 806 exits waveguide 812 (e.g., point 816).

Continuing with this example, a portion of eye 818 may reflect light from illumination sequence 808 back into waveguide 812 at point 816. Waveguide 812 may guide the reflected light toward point 814, where the reflected light may exit waveguide 812 and/or pass into lens 810. Lens 810 may direct the reflected light toward event camera 820. Detecting module 106 may therefore detect, via event camera 820, a set of events, where each event included in the set of events includes and/or describes a change in an intensity of light received by a pixel included in event camera 820 over a sampling period during the illumination sequence (e.g., illumination sequence 808). In some examples, a predetermined position associated with event camera 820 may be associated with a point where reflected light from eye 818 enters waveguide 812 (e.g., point 816). Determining module 108 may then determine a shape of a portion of eye 818 (e.g., a cornea of eye 818) in any of the ways described herein. Additional examples of waveguides and/or waveguide displays may be described below in reference to FIGS. 10-11.

As discussed throughout the instant disclosure, the disclosed systems and methods may provide one or more advantages over traditional, standard, or conventional systems and methods for mapping a surface of an eye. As described herein, an event camera (e.g., event camera 150) may provide extremely high sample rates in comparison to traditional global-shutter and/or rolling-shutter cameras. Additionally, event data provided by the event camera may be sparse in comparison to frame data provided by conventional global-shutter and/or rolling-shutter cameras, and hence may be simpler to process than such frame data. Therefore, by directing an illumination source to illuminate a portion of a cornea of a user in accordance with an illumination sequence and detecting a set of events via an event camera as described herein, the apparatuses, systems, and methods described herein may efficiently obtain and/or process many samples of the cornea of the user, and may use these many samples to determine a shape of the cornea in various ways described herein.

Furthermore, in some examples, the apparatuses, systems, and methods described herein may be used to biometrically identify the user based on the determined cornea shape. In additional or alternative examples, these methods may be performed in a repeated or periodic fashion in order to track a position of the cornea of a user and/or a gaze of the user over time. Moreover, in some embodiments, the apparatuses, systems, and methods described herein may aid in detection and/or diagnosis of medical conditions related to a shape of a patient's cornea, such as astigmatism, keratitis, keratoconus, and/or a cornea dystrophy.

EXAMPLE EMBODIMENTS

Example 1: A computer-implemented method comprising (1) directing an illumination source, positioned at a predetermined position relative to an event camera positioned to receive light from the illumination source reflected by a portion of a cornea of a user during an illumination sequence, to illuminate the portion of the cornea of the user in accordance with the illumination sequence, (2) detecting, via the event camera, a set of events, each event in the set of events comprising a change in an intensity of light from the illumination source received by a pixel included in the event camera over a sampling period of the event camera, and (3) determining a shape of the portion of the cornea of the user based on the predetermined position, the illumination sequence, and the set of events.

Example 2: The computer-implemented method of example 1, further comprising (1) detecting, via the event camera, an additional set of events, and (2) tracking a motion of the cornea of the user based on the shape of the portion of the cornea of the user and the additional set of events.

Example 3: The computer-implemented method of any of examples 1 and 2, wherein determining the shape of the cornea of the user comprises generating a map of the shape of the portion of the cornea of the user based on the predetermined position, the illumination sequence, and the set of events.

Example 4: The computer-implemented method of any of examples 1-3, wherein determining the shape of the portion of the cornea of the user comprises (1) identifying the user based on the predetermined position, the illumination sequence, and the set of events, and (2) accessing information representative of a pre-generated map of the shape of the portion of the cornea of the user based on identifying the user.

Example 5: The computer-implemented method of any of examples 1-4, further comprising (1) detecting a deviation in the shape of the cornea of the user, and (2) adjusting, based on the deviation in the shape of the portion of the cornea of the user, a calibration value associated with at least one of (a) the illumination source, (b) the event camera, or (c) a control device communicatively coupled to the illumination source and the event camera.

Example 6: The computer-implemented method of any of examples 1-5, wherein (1) at least one of the illumination source or the event camera is included in a head-mounted display, (2) the event camera is positioned to receive light reflected by the portion of the cornea of the user as the user wears the head-mounted display, and (3) the illumination source is positioned to illuminate the portion of the cornea of the user as the user wears the head-mounted display.

Example 7: The computer-implemented method of example 6, wherein the head-mounted display comprises a waveguide display.

Example 8: The computer-implemented method of example 7, wherein at least one of (1) the illumination source is positioned to illuminate the portion of the cornea of the user via an optical pathway of the waveguide display, or (2) the event camera is positioned to receive light reflected by the portion of the cornea of the user via the optical pathway of the waveguide display.

Example 9: The computer-implemented method of any of examples 1-8, wherein the computer-implemented method further comprises (1) determining (a) a source amount of electrical power available to the illumination source, the event camera, and a control device communicatively coupled to the illumination source and the event camera, (b) a system power requirement comprising at least one of (i) an illumination electrical power requirement of the illumination source, (ii) a detection electrical power requirement of the event camera, or (iii) a control electrical power requirement of the control device, and (c) a system bandwidth availability comprising at least one of (i) an illumination bandwidth of the illumination source, (ii) a detection bandwidth of the event camera, or (iii) a computing bandwidth of the control device, and (2) adjusting, based on the source amount of electrical power, the system power requirement, and the system bandwidth availability, at least one of (a) the illumination sequence, (b) a sample rate of the event camera, or (c) a computing resource of the control device.

Example 10: The computer-implemented method of any of examples 1-9, wherein the illumination source comprises a plurality of illuminator elements.

Example 11: The computer-implemented method of example 10, wherein the plurality of illuminator elements comprises at least four illuminator elements.

Example 12: The computer-implemented method of any of examples 10 and 11, wherein (1) the predetermined position comprises, for each illuminator element included in the plurality of illuminator elements, a different position relative to the cornea of the user, and (2) determining the shape of the portion of the cornea of the user based on the predetermined position comprises determining the shape of the portion of the cornea of the user based on each different position relative to the cornea of the user.

Example 13: The computer-implemented method of any of examples 10-12, wherein (1) each illuminator element included in the plurality of illuminator elements is associated with an illumination attribute that distinguishes the illuminator element from other illuminator elements included in the plurality of illuminator elements during the illumination sequence, and (2) determining the shape of the portion of the cornea of the user based on the predetermined position, the illumination sequence, and the event comprises (a) detecting, via the event camera, at least one illumination attribute associated with at least one illuminator element included in the plurality of illuminator elements that at least partially caused an event included in the set of events, and (b) identifying the illuminator element based on the illumination attribute associated with the illuminator element that at least partially caused the event included in the set of events.

Example 14: The computer-implemented method of example 13, wherein the illumination attribute comprises at least one of (1) a pulse time offset, (2) a pulse code, (3) a pulse frequency, (4) a polarization, or (5) a wavelength.

Example 15: The computer-implemented method of any of examples 1-14, wherein the illumination source is synchronized with a clock of the event camera.

Example 16: An apparatus comprising (1) an illumination source positioned to illuminate a portion of a cornea of a user in accordance with an illumination sequence, (2) an event camera positioned to receive light from the illumination source reflected by the portion of the cornea of the user during the illumination sequence, the illumination source positioned at a predetermined position relative to the event camera, and (3) a control device that (i) directs the illumination source to illuminate the portion of the cornea of the user in accordance with the illumination sequence, (ii) detects, via the event camera, a set of events, each event in the set of events comprising a change in an intensity of light received by a pixel included in the event camera over a sampling period during the illumination sequence, and (iii) determines a shape of the portion of the cornea of the user based on the predetermined position, the illumination sequence, and the set of events.

Example 17: The apparatus of example 16, wherein the control device further (1) detects, via the event camera, an additional set of events, and (2) tracks a motion of the cornea of the user based on the shape of the portion of the cornea of the user and the additional set of events.

Example 18: The apparatus of any of examples 16 and 17, wherein (1) at least one of the event camera or the illumination source are included in a head-mounted display, (2) the event camera is positioned to receive light reflected by the portion of the cornea of the user as the user wears the head-mounted display, and (3) the illumination source is positioned to illuminate the portion of the cornea of the user as the user wears the head-mounted display.

Example 19: The apparatus of example 18, wherein the head-mounted display comprises a waveguide display.

Example 20: A non-transitory computer-readable medium comprising computer-readable instructions that, when executed by at least one processor of a computing system, cause the computing system to (1) direct an illumination source, positioned at a predetermined position relative to an event camera positioned to receive light from the illumination source reflected by a portion of a cornea of a user during an illumination sequence, to illuminate the portion of the cornea of the user in accordance with an illumination sequence, (2) detect, via the event camera, a set of events, each event in the set of events comprising a change in an intensity of light received by a pixel included in the event camera over a sampling period during the illumination sequence, and (3) determine a shape of the portion of the cornea of the user based on the predetermined position, the illumination sequence, and the set of events.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
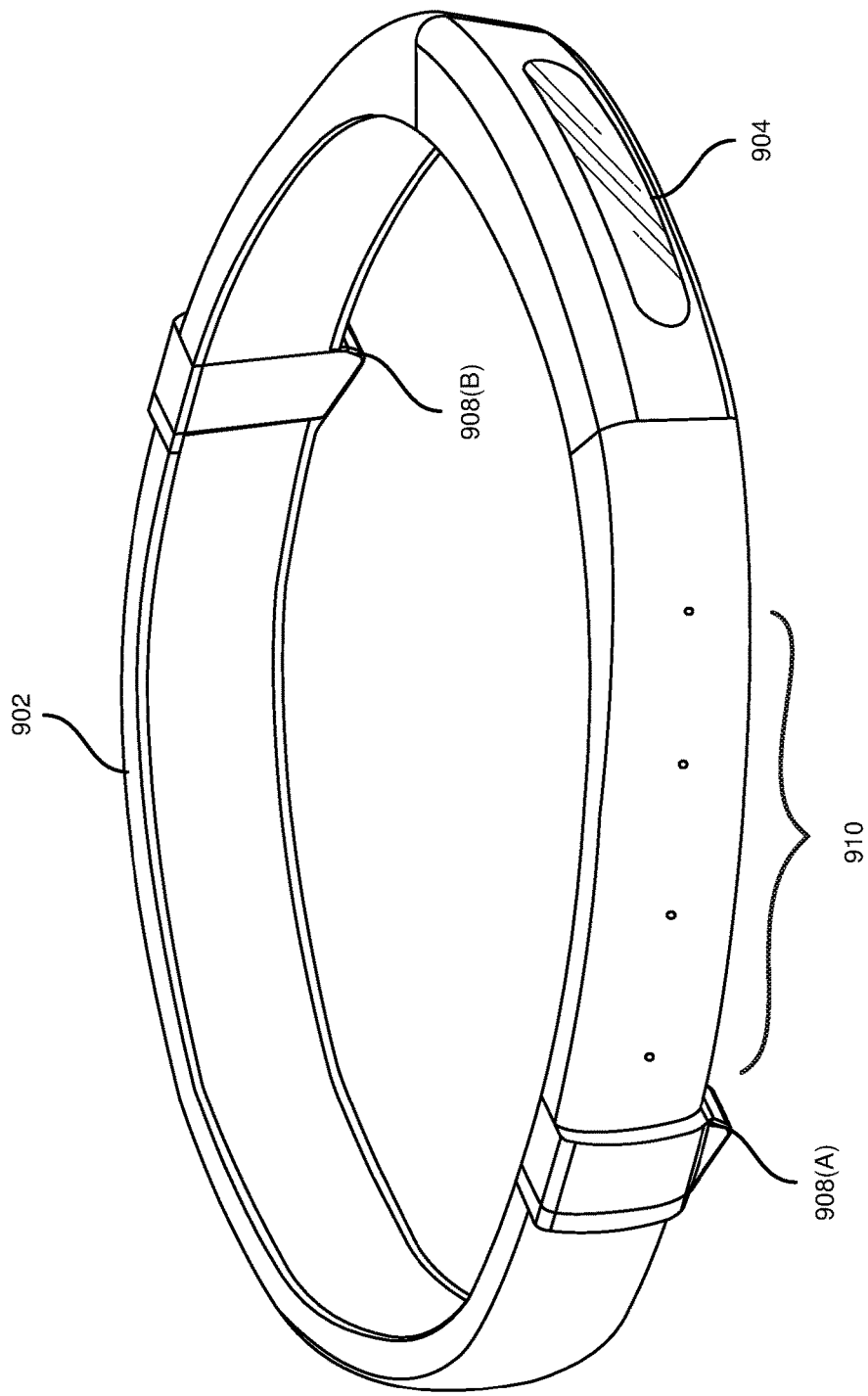
FIG. 9 is an illustration of an example artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
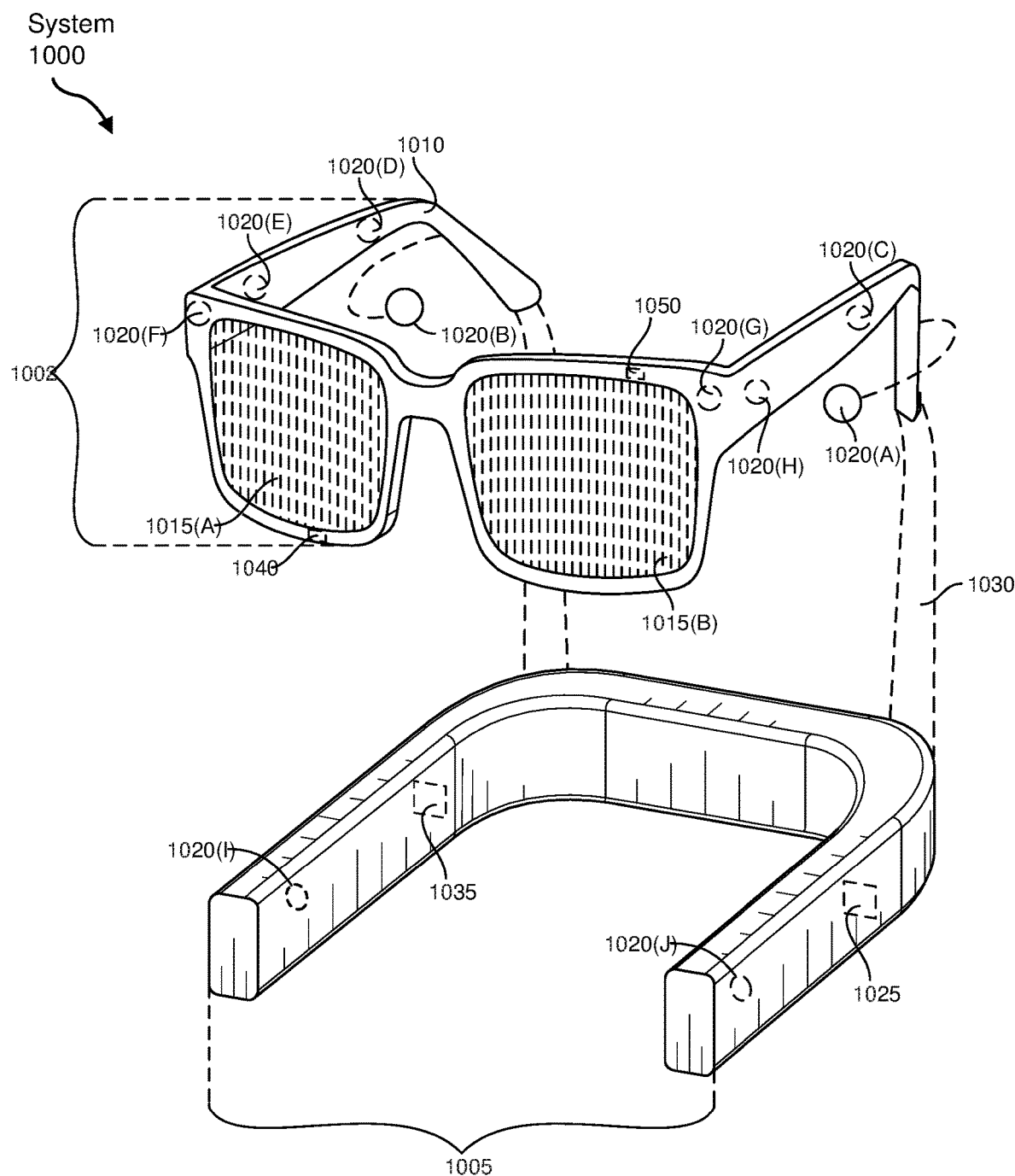
FIG. 10 is an illustration of example augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof. Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof. Furthermore, Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
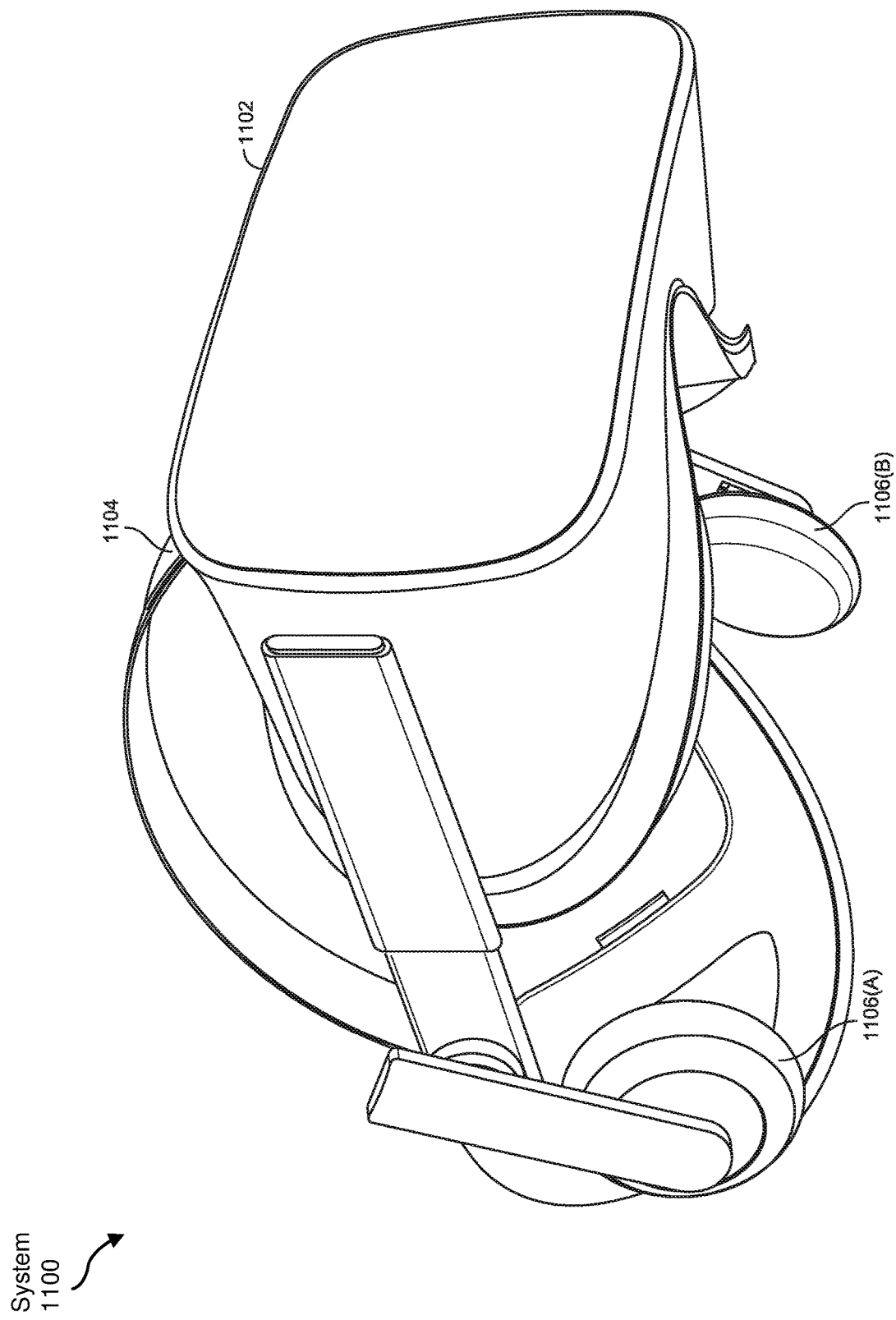
FIG. 11 is an illustration of an example virtual-reality headset that may be used in connection with embodiments of this disclosure.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive event camera data to be transformed, transform the event camera data, output a result of the transformation to determine a shape of a portion of an eye of a user, use the result of the transformation to determine the portion of the cornea of the user, and store the result of the transformation to track the cornea of the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   directing an illumination source, positioned at a predetermined position relative to an event camera positioned to receive light from the illumination source reflected by a portion of a cornea of a user during an illumination sequence, to illuminate the portion of the cornea of the user in accordance with the illumination sequence;
   detecting, via the event camera, a set of events, each event in the set of events representing a change greater than a threshold brightness value in a brightness of light from the illumination source received by a pixel included in the event camera over a sampling period of the event camera, each pixel included in the event camera configured to, asynchronously and independently of any other pixel included in the event camera, detect changes in brightness greater than the threshold brightness value during sampling periods of the event camera; and
   determining a shape of the portion of the cornea of the user based on the predetermined position, the illumination sequence, and the set of events.

2. The computer-implemented method of claim 1, further comprising:
   detecting, via the event camera, an additional set of events; and
   tracking a motion of the cornea of the user based on the shape of the portion of the cornea of the user and the additional set of events.

3. The computer-implemented method of claim 1, wherein determining the shape of the cornea of the user comprises generating a map of the shape of the portion of the cornea of the user based on the predetermined position, the illumination sequence, and the set of events.

4. The computer-implemented method of claim 1, wherein determining the shape of the portion of the cornea of the user comprises:
   identifying the user based on the predetermined position, the illumination sequence, and the set of events; and
   accessing information representative of a pre-generated map of the shape of the portion of the cornea of the user based on identifying the user.

5. The computer-implemented method of claim 1, further comprising:
   detecting a deviation in the shape of the cornea of the user; and
   adjusting, based on the deviation in the shape of the portion of the cornea of the user, a calibration value associated with at least one of:

the illumination source;

the event camera; or a control device communicatively coupled to the illumination source and the event camera.

6. The computer-implemented method of claim 1, wherein:

at least one of the illumination source or the event camera is included in a head-mounted display;

the event camera is positioned to receive light reflected by the portion of the cornea of the user as the user wears the head-mounted display; and the illumination source is positioned to illuminate the portion of the cornea of the user as the user wears the head-mounted display.

7. The computer-implemented method of claim 6, wherein the head-mounted display comprises a waveguide display.

8. The computer-implemented method of claim 7, wherein at least one of:

the illumination source is positioned to illuminate the portion of the cornea of the user via an optical pathway of the waveguide display; or the event camera is positioned to receive light reflected by the portion of the cornea of the user via the optical pathway of the waveguide display.

9. The computer-implemented method of claim 1, wherein the computer-implemented method further comprises:

determining:

a source amount of electrical power available to the illumination source, the event camera, and a control device communicatively coupled to the illumination source and the event camera;

a system power requirement comprising at least one of:

an illumination electrical power requirement of the illumination source;

a detection electrical power requirement of the event camera; or a control electrical power requirement of the control device; and a system bandwidth availability comprising at least one of:

an illumination bandwidth of the illumination source;

a detection bandwidth of the event camera; or a computing bandwidth of the control device; and adjusting, based on the source amount of electrical power, the system power requirement, and the system bandwidth availability, at least one of:

the illumination sequence;

a sample rate of the event camera; or a computing resource of the control device.

10. The computer-implemented method of claim 1, wherein the illumination source comprises a plurality of illuminator elements.

11. The computer-implemented method of claim 10, wherein the plurality of illuminator elements comprises at least four illuminator elements.

12. The computer-implemented method of claim 10, wherein:

the predetermined position comprises, for each illuminator element included in the plurality of illuminator elements, a different position relative to the cornea of the user; and determining the shape of the portion of the cornea of the user based on the predetermined position comprises determining the shape of the portion of the cornea of the user based on each different position relative to the cornea of the user.

13. The computer-implemented method of claim 10, wherein:

each illuminator element included in the plurality of illuminator elements is associated with an illumination attribute that distinguishes the illuminator element from other illuminator elements included in the plurality of illuminator elements during the illumination sequence; and determining the shape of the portion of the cornea of the user based on the predetermined position, the illumination sequence, and the event comprises:

detecting, via the event camera, at least one illumination attribute associated with at least one illuminator element included in the plurality of illuminator elements that at least partially caused an event included in the set of events; and identifying the illuminator element based on the illumination attribute associated with the illuminator element that at least partially caused the event included in the set of events.

14. The computer-implemented method of claim 13, wherein the illumination attribute comprises at least one of:

a pulse time offset;

a pulse code;

a pulse frequency;

a polarization; or a wavelength.

15. The computer-implemented method of claim 1, wherein the illumination source is synchronized with a clock of the event camera.

16. An apparatus comprising:

an illumination source positioned to illuminate a portion of a cornea of a user in accordance with an illumination sequence;

an event camera positioned to receive light from the illumination source reflected by the portion of the cornea of the user during the illumination sequence, the illumination source positioned at a predetermined position relative to the event camera; and a control device that:

directs the illumination source to illuminate the portion of the cornea of the user in accordance with the illumination sequence;

detects, via the event camera, a set of events, each event in the set of events representing a change greater than a threshold brightness value in a brightness of light received by a pixel included in the event camera over a sampling period during the illumination sequence, each pixel included in the event camera configured to, asynchronously and independently of any other pixel included in the event camera, detect changes in brightness greater than the threshold brightness value during sampling periods of the event camera; and determines a shape of the portion of the cornea of the user based on the predetermined position, the illumination sequence, and the set of events.

17. The apparatus of claim 16, wherein the control device further:

detects, via the event camera, an additional set of events; and tracks a motion of the cornea of the user based on the shape of the portion of the cornea of the user and the additional set of events.

18. The apparatus of claim 16, wherein:
at least one of the event camera or the illumination source are included in a head-mounted display;
the event camera is positioned to receive light reflected by the portion of the cornea of the user as the user wears the head-mounted display; and
the illumination source is positioned to illuminate the portion of the cornea of the user as the user wears the head-mounted display.

19. The apparatus of claim 18, wherein the head-mounted display comprises a waveguide display.

20. A non-transitory computer-readable medium comprising computer-readable instructions that, when executed by at least one processor of a computing system, cause the computing system to:
direct an illumination source, positioned at a predetermined position relative to an event camera positioned to receive light from the illumination source reflected by a portion of a cornea of a user during an illumination sequence, to illuminate the portion of the cornea of the user in accordance with an illumination sequence;
detect, via the event camera, a set of events, each event in the set of events representing a change greater than a threshold brightness value in a brightness of light received by a pixel included in the event camera over a sampling period during the illumination sequence, each pixel included in the event camera configured to, asynchronously and independently of any other pixel included in the event camera, detect changes in brightness greater than the threshold brightness value during sampling periods of the event camera; and
determine a shape of the portion of the cornea of the user based on the predetermined position, the illumination sequence, and the set of events.

* * * * *